United States Patent [19]
Yakimovsky

[11] Patent Number: 5,214,540
[45] Date of Patent: May 25, 1993

[54] CURVED MIRROR OPTICAL SYSTEMS

[76] Inventor: Yoram Yakimovsky, 17860 Robinview Ct., West Linn, Oreg. 97068

[21] Appl. No.: 640,772

[22] Filed: Jan. 14, 1991

[51] Int. Cl.$^5$ ............................................. G02B 5/10
[52] U.S. Cl. ................................. 359/858; 359/859
[58] Field of Search ............... 350/619, 620; 359/857, 359/858, 859, 402, 727, 728, 729, 730, 731, 868, 869

[56] References Cited

U.S. PATENT DOCUMENTS

| | | | |
|---|---|---|---|
| 1,814,667 | 7/1931 | Cowdrey | 350/620 |
| 3,203,328 | 8/1965 | Brueggemann | 359/859 |
| 3,697,154 | 10/1972 | Johnson | 350/620 |
| 3,752,559 | 8/1973 | Fletcher et al. | 359/731 |
| 3,827,059 | 7/1974 | Rambauske | 359/859 |
| 4,265,510 | 5/1981 | Cook | 350/620 |
| 4,722,101 | 2/1988 | Blower | 359/859 |
| 4,733,955 | 3/1988 | Cook | 350/620 |

FOREIGN PATENT DOCUMENTS

| | | | |
|---|---|---|---|
| 0096193 | 12/1983 | European Pat. Off. | 350/620 |
| 0323006 | 7/1920 | Fed. Rep. of Germany | 350/620 |
| 1062289 | 4/1954 | France | 350/620 |
| 0299857 | 11/1936 | Italy | 350/620 |
| 0470775 | 5/1975 | U.S.S.R. | 350/620 |
| 0108315 | 1/1918 | United Kingdom | 350/620 |

OTHER PUBLICATIONS

Jenkins et al., "Fundamental of Optics", 3rd Edition, 1957 by McGraw-Hill Book Company, Inc. pp. 3-10.
Shafer; "Laser Beam Expander-A New Design"; SPIE vol. 190 LASL Optics Conference (1979) pp. 15-20.

Primary Examiner—Bruce Y. Arnold
Assistant Examiner—R. D. Shafer
Attorney, Agent, or Firm—Olson & Olson

[57] ABSTRACT

Optical mirror systems are provided by cooperative arrangements of a plurality of curved mirrors, preferably of approximately elliptical and hyperbolic shapes. In one arrangement, a convex segment of an hyperbolic primary mirror and a concave segment of an hyperbolic secondary mirror form a forward looking magnification system. In another arrangement, a concave segment of an elliptical primary mirror and a convex segment of an hyperbolic secondary mirror form a microscope. In still another arrangement, a convex segment of an hyperbolic primary mirror, a concave segment of an hyperbolic intermediate mirror and a concave segment of an elliptical secondary mirror form a periscope which may be assembled on an automobile for use as a wide angle rearview mirror in which the primary mirror is supported above the vehicle roof, the intermediate mirror is mounted on the dashboard in optical registry with the primary mirror through the windshield, and the secondary mirror also is mounted on the dashboard laterally displaced from the intermediate mirror for viewing by the driver of the vehicle.

6 Claims, 3 Drawing Sheets

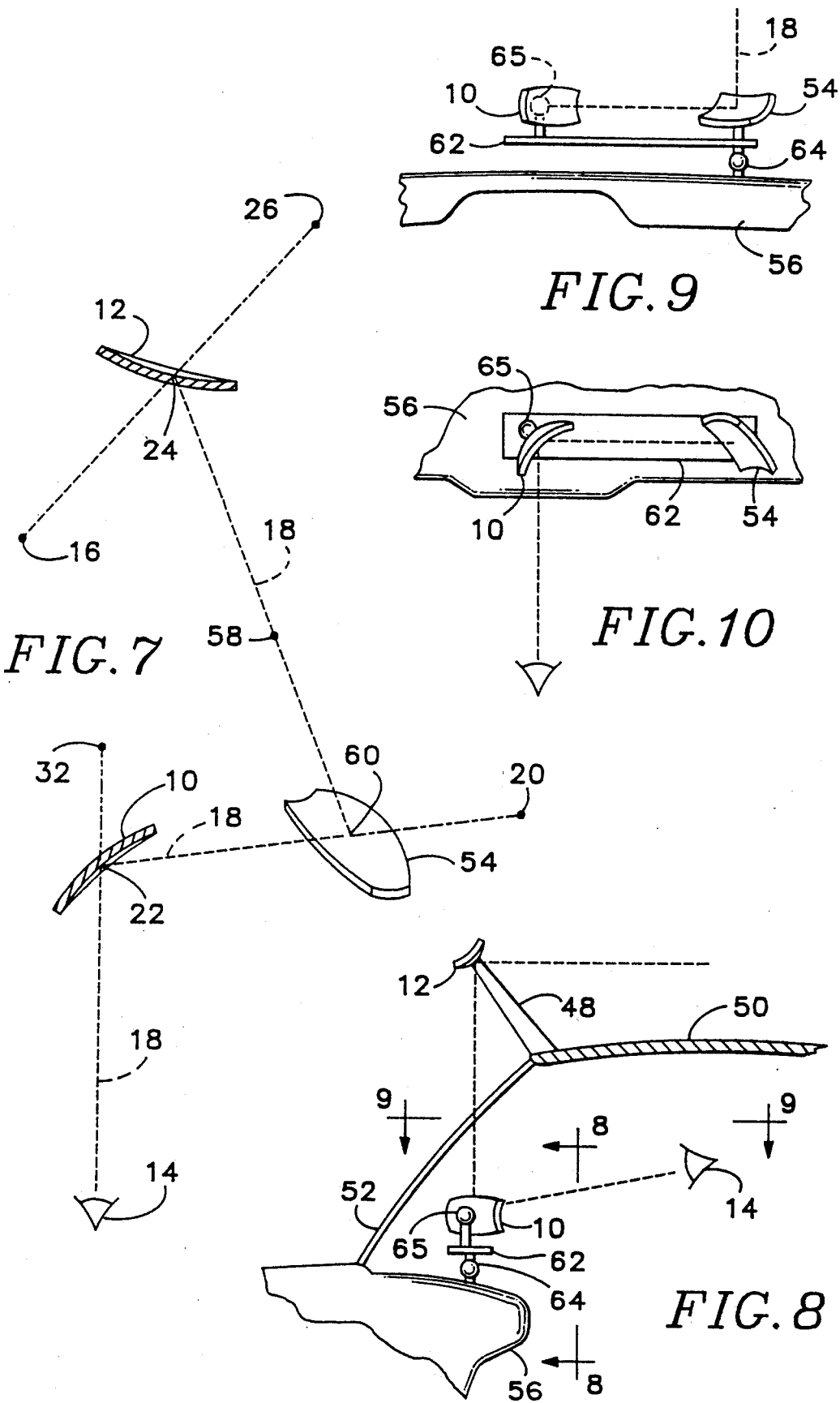

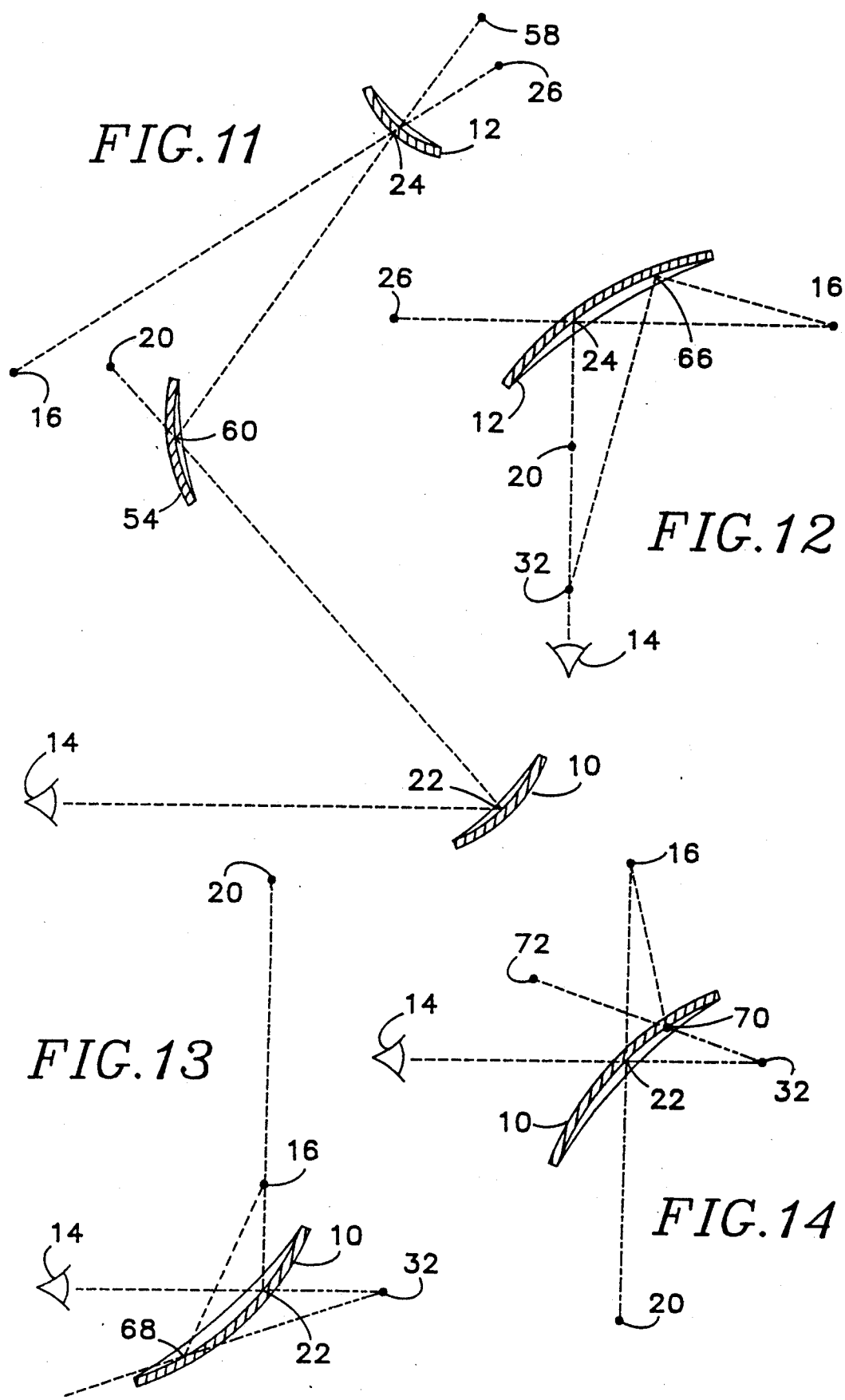

CURVED MIRROR OPTICAL SYSTEMS

BACKGROUND OF THE INVENTION

This invention relates to optical systems, and more particularly to curved mirror optical systems including two mirror magnifying systems and two and three mirror periscope systems.

Multiple mirror optical systems usually utilize two or more plane surface mirrors. In these systems, lenses which are rotationally symmetric are often mounted along the axis of symmetry of the system. Standard ray tracing para-axial lens mathematics is used to achieve the optical engineering goals. Typical of such systems are the common binocular and periscope systems. The use of curved mirrors in optical systems has been much more limited and have been characterized by excessive structural and optical complications, and correspondingly high cost of manufacture, while producing images of reduced quality.

A matched pair of curved mirrors are used in various telescope, microscope and projection systems. Typical of such a system is the Cassegrain telescope with its various modifications, including the Ritchey-Chertein telescope using two hyperboloid mirrors (see U.S. Pat. No. 3,752,559). In these telescope systems the light from objects being viewed is first reflected by a large primary mirror onto a smaller secondary mirror which is positioned at the center of the field of view of the primary mirror. The optical axis is identical with the path of a light ray from the eye of the observer to an object at the center of the field of view through the optical system. The two mirrors are rotationally symmetric about the optical axis. The observer looks at the secondary mirror through a hole at the center of the primary mirror.

This telescope design places a small secondary mirror far from the eye of the observer, and the observer has to look through several refractive lenses to see the image generated by the small and far away secondary mirror. The optical quality and the magnification is largely determined by the mirrors, but to allow a view of the image several refractive lenses are needed. The secondary mirror conceals objects in the center of the field of view, because it is at the center of the field of view of the primary mirror. Lenses cause chromatic aberration and also limit the range of electromagnetic radiation that the telescope may use.

Several telescopes using three or more mirrors and no lenses are disclosed in U.S. Pat. Nos. 3,674,334; 4,101,195; 4,215,273; 4,226,501; 4,240,707; 4,265,510; 4,632,521; 4,645,314; 4,733,955; 4,737,021; 4,804,258; 4,834,517; and 4,964,706. These systems project real images directly on sensors. Some of these systems are also off-axis and eliminate the central obstruction by the secondary mirror present in prior telescopes. These systems use more mirrors than necessary, resulting in increased cost and optical aberration.

A combination of two reflecting and two refracting surfaces which are rotationally symmetric about the optical axis, is used in the Maksutov optical systems, as described in "New Catadioptric Meniscus System" by D.D. Maksutov, Journal of Optical Society of America, Vol. 34, No. 5, May, 1944. Maksutov developed the technique whereby several refractive surfaces, e.g. lenses, are used to correct optical aberrations caused by two spherical mirrors. The Maksutov microscope is typical of such a system. Recent off-axis designs based upon the Maksutov approach are shown in U.S. Pat. Nos. 4,196,961; 4,293,186; 4,344,676; 4,711,535; 4,747,678 4,812,028; and 4,964,705. Geometrical and chromatic aberrations are still major problems in such systems.

U.S. Pat. No. 4,927,256 discloses a two curved mirror, side-looking telescope wherein the primary mirror is an off-axis segment of a concave paraboloid surface and the secondary mirror is a concave segment of an hyperboloid. The secondary mirror is moved off-axis. Because of the specific shape selected, this optical system will not be suitable for direct forward viewing by the eye and there is an increased optical aberration in the periphery. Additional optical elements will be required to overcome those limitations, as admitted by the authors.

U.S. Pat. No. 4,812,030 discloses a zoom system built around a rotationally symmetric co-axial two-mirror system. This system suffers from the central concealment effect resulting from placement of the secondary mirror at the center of the field of view of the primary mirror mentioned before.

Conventional rearview mirrors in cars have many blind spots. Rearview periscope mirror systems for use with automobiles and other vehicles attempting to eliminate such blind spots heretofore have employed planar mirrors. Some have required a special opening in the roof of the vehicle for communication between interior and exterior mirrors. With planar mirrors, the internal mirrors are small and result in limited field of view. Also, the external mirror needs to be large because of linear divergence of the line of sight from the vehicle driver. Typical of these are the periscope structures disclosed in U.S. Pat. Nos. 3,058,395; 3,704,062; 3,909,117; 3,914,028; 3,915,562; 3,947,096; 3,979,158; 4,114,989; 4,120,566; and 4,277,142.

Prior attempts also have been made to provide a rearview periscope composed of only two mirrors. Exemplary of these are the systems disclosed in U.S. Pat. Nos. 4,110,012 which employs one elliptically curved mirror and an associated flat mirror; and 4,033,678 which utilizes two cylindrically concave mirrors. In both of these systems the use of two mirrors to obtain an upright image of objects to the rear resulted in a very short distance of in-focus viewing sandwiched between relatively long distances of out-of-focus viewing.

SUMMARY OF THE INVENTION

Basically, the mirror systems of this invention utilize curved primary and secondary mirrors one of which is concave and the other of which is convex and configured to provide enlarged or reduced images for direct viewing. An intermediate mirror may be added to the two mirror system to allow upright and true right-to-left rear viewing.

It is the principal objective of this invention to provide a curved mirror optical system which overcomes the aforementioned limitations and disadvantages of prior mirror systems.

Another objective of this invention is the provision of a mirror system of the class described for use as a rearview mirror system for automobiles and in which the mirror outside the automobile is relatively small and unobtrusive and yet provides a wide angle view for the driver.

Still another objective of this invention is the provision of a mirror system of the class described to be worn on the head to provide a novel binocular scope.

A further objective of this invention is the provision of a mirror system of the class described configured in the form of a two mirror magnifying periscope for unencumbered view of a magnified image.

A still further objective of this invention is the provision of mirror systems of the class described which are of simplified construction for economical manufacture on a mass production scale.

The foregoing and other objects and advantages of this invention will appear from the following detailed description, taken in connection with the accompanying drawings of preferred embodiments.

BRIEF DESCRIPTION OF THE DRAWINGS

FIG. 7 is a schematic representation of a three mirror system utilizing curved mirrors configured to provide a wide angle rearview periscope.

FIG. 8 is a fragmentary vertical section illustrating the three curved mirror arrangement of FIG. 7 associated with an automobile for use as a wide angle rearview periscope.

FIG. 9 is a fragmentary vertical elevation as viewed in the direction of arrows 9—9 in FIG. 8 and illustrating the mounting of the primary and intermediate mirrors on the dashboard of FIG. 8.

FIG. 10 is a fragmentary sectional view taken on the line 10—10 in FIG. 8.

FIG. 11 is a schematic representation of a three mirror rearview periscope system in which three curved mirrors are disposed in vertically spaced apart arrangement.

FIG. 12 is a schematic demonstration of image formation by a concave hyperbolic mirror.

FIG. 13 is a graphic demonstration of image formation by a concave elliptical mirror.

FIG. 14 is a graphical demonstration of image formation by a convex hyperbolic mirror.

DESCRIPTION OF THE PREFERRED EMBODIMENTS

Figure 1:
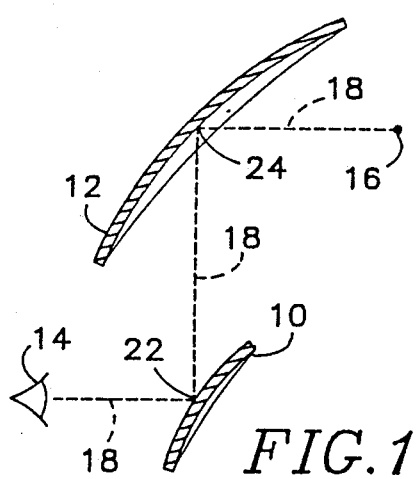
FIG. 1 is a graphical representation of a magnifying optical system utilizing two curved mirrors, the primary mirror being concave and the secondary being convex.

FIG. 1 illustrates schematically a forward looking image magnification optical system having two reflecting curved optical surfaces 10 and 12. The reflecting surface 10 into which the eye 14 of an observer looks is called the secondary mirror. The other reflecting surface 12 is called the primary mirror. The center of mirror 10 is 22 and the center of mirror 12 is 24. Light from an object 16 will be reflected from the primary mirror onto the secondary mirror and from there into the eye 14 of the observer. The object 16 is a point which is imaged onto the center of the field of view when the image is viewed from the position of the eye 14 of the observer. The optical axis 18 of the system is a tracing of a ray of light from the object 16 to the center 24 of the primary mirror 12 from which it is reflected to the center 22 of the secondary mirror 10 and thence reflected to the eye 14 of the observer.

There are an infinite number of possible pairs of curved mirrors that may be employed for purposes of this invention. It is convenient to analyze and design with hyperbolic and elliptical surface mirrors, and the image quality generated by such mirrors is very good. Polynomial and numerical analyses techniques may be used to modify the curved surfaces to enhance image quality and reduce aberrations. This is analagous to the use of those techniques in modifying spherical lens surfaces to improve image quality in the usual optical systems which are rotationally symmetric about the optical axis.

For my discussion, an ellipse is a two dimensional surface defined by two focal centers. The sum of the distances from each point on the ellipse to the two focal centers is the same. It is well established for elliptical surface mirrors, that when a ray of light passes through one of the focal centers and is reflected by the elliptical mirror, the reflected light beam will pass through the other focal center. It is to be noted that for an ellipse both focal centers will be on the same side of the mirror surface.

For my discussion, an hyperbola is a two dimensional surface defined by two focal centers. The difference between the distances of each point on the hyperbola to each of the two focal centers is the same. A light ray passing through a focal center of an hyperbolic mirror will be reflected on a line passing through the second focal point of the hyperbolic mirror. The ray of light will travel on that line away from the second focal center. Each of the two focal centers is on a different side of the mirror.

Figure 2:
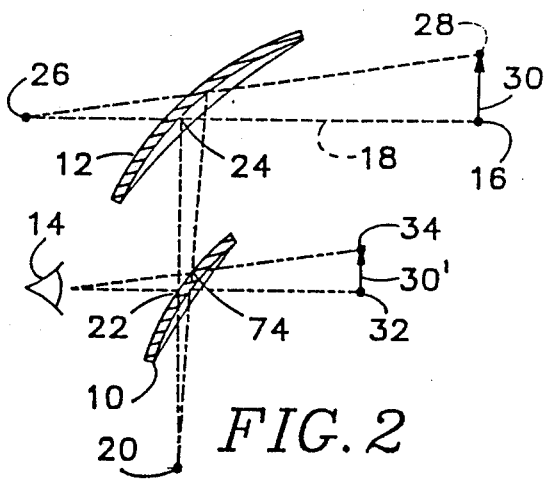
FIG. 2 is a graphical representation of a two mirror system utilizing two hyperbolic mirrors, the primary mirror being concave and the secondary being convex.

The first ramification is a forward looking magnification system. The primary mirror will be concave and the secondary mirror will be convex. The secondary mirror will be close to the eye of the observer. Objects will be imaged behind the secondary mirror as a virtual image. The virtual image of objects of interest will be far enough so that the observer's eye will easily accommodate on the virtual image. FIG. 2 of the drawings demonstrates an embodiment of this optical system in which the curved mirrors are off-axis sections of hyperbolas. The secondary mirror 10 is a convex hyperbola and the primary mirror is an off-axis section of a concave hyperbola.

The hyperbola which is the surface of the secondary mirror 10 has one focal center at the center of the pupil of the eye 14 of the observer and the second focal center 20 is behind the surface of the mirror. Note that the second focal center is on a straight line passing through the centers 22 and 24 of the secondary and primary mirrors, respectively. Placing the pupil of the eye 14 of the observer at the focal point of the hyperbola reduces substantially the optical aberrations, particularly astigmatism.

The hyperbola defining the primary mirror 12 has one focal center at the same point 20 as the second focal center of the secondary mirror 10. The other focal center 26 is behind the primary mirror 12 on the line which is an extension of the optical axis 18 from the object 16 to the center 24 of the primary mirror 12.

In FIG. 2, a point 28 displaced from the optical axis 18 forms with the point 16 a representation of an object 30. That object will be imaged as a virtual image 30' between the points 32 and 34.

The magnification M is defined as the ratio between the angle that spans the object 30 from the focal center 26 of the primary mirror 12 and the spanning angle of the virtual image 30' when viewed from the eye 14 of the observer:

$$M = \text{angle } 32\text{-}14\text{-}34 / \text{angle } 16\text{-}26\text{-}28$$

To design such a system it is necessary to define the relationships between the focal points, the distances between the mirrors and the desired image position. The following formulas relate those parameters and are derived by using the paraxial mathematics of elliptical and hyberbolic mirrors which are described hereinafter. Let:

L1 be the distance from the eye 14 of the observer to the center 22 of the secondary mirror 10.

L2 be the distance from the center 22 of the secondary mirror 10 to the center 24 of the primary mirror 12.

R1 be the distance from the center 22 of the secondary mirror 10 to the second focal point 20.

R2 be the distance from the center 24 of the primary mirror 12 to the other focal point 26 of the primary mirror 12.

S1 be the distance from the center 22 of the secondary mirror 10 to the virtual image point 32.

S2 the distance from the center 24 of the primary mirror 12 to the object point 16.

Magnification will occur when M is greater than 1, and reduction will occur when M is less than 1.

To satisfy the magnification requirement:

$$R2 = M \cdot L1 + M \cdot L1 \cdot L2/R1$$

Using paraxial first order approximations for hyperbolas:

$$(1/S2/R2) \cdot (1 + L2/R1) = [(1 + S2/R2) \cdot L2 + S2 \cdot R1/(L2 + R1)] \cdot (1/S1 + 1/L1)$$

The above equations allow setting parameters as desired so as to design a two mirror system to achieve a desired magnification and image location.

Figure 3:
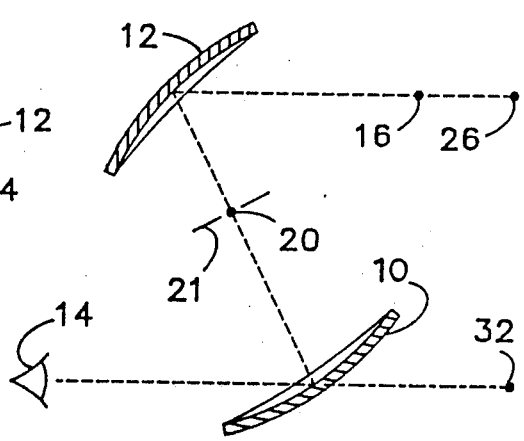
FIG. 3 is a graphical representation of a two mirror system utilizing two concave elliptical mirrors.

One should note that these two equations will have two solutions one with both R1 and R2 positive and another with R1 and R2 negative. The negative solution for R1 and R2 means that an equivalent optical system with two concave elliptical mirrors can achieve the same optical engineering goals. This is shown in FIG. 3 wherein primary mirror 12 and secondary mirror 10 are concave, off-axis segments of ellipses and an optical stop 21, which serves as an optical instrument pupil, is centered around the common focal point 20 of the two mirrors. It is to be noted that the observer may be the eye 14 or an instrument sensor the pupil of which is centered at 14.

Presently, I prefer the hyperbolic mirrors, but one skilled in the art can easily design the elliptical system. Dual solutions are also available for the systems discussed hereinafter.

Figure 4:
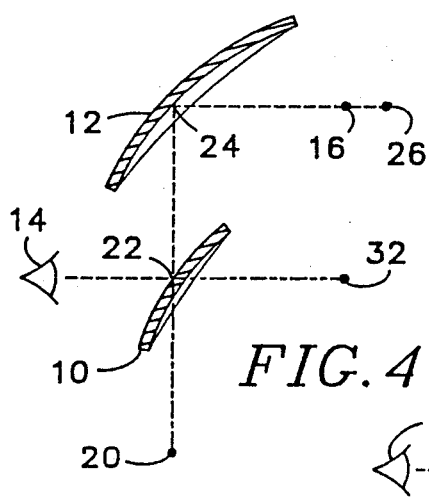
FIG. 4 is a schematic representation of a two mirror magnification system utilizing a hyperbolic convex secondary mirror and an elliptical concave primary mirror.

Another embodiment for a two curved mirror magnification system is illustrated in FIG. 4 wherein the primary mirror 12 is an ellipse and the secondary 10 is a hyperbola. This arrangement will provide a near object magnification device, such as a microscope. The relationship between the geometrical parameters of the system are:

$$(1/S2 - 1/R2) \cdot (1 + L2/R1) =$$
$$[R2/(R2 + L2) + L2 \cdot (1/S2 - 1/R2)] \cdot (1/R1 + 1/S1) \text{ and}$$
$$M \cdot L1 \cdot (L2 + R1) = R1 \cdot R2$$

The two mirrors are mounted such that the mounts do not interfere with clear passage of light from objects in the environment to the eye 14 of the observer. A mount which allows the exchange of different secondary mirrors 10 in a manner analogous to changing eye pieces in a conventional telescope is a viable option.

Figure 5:
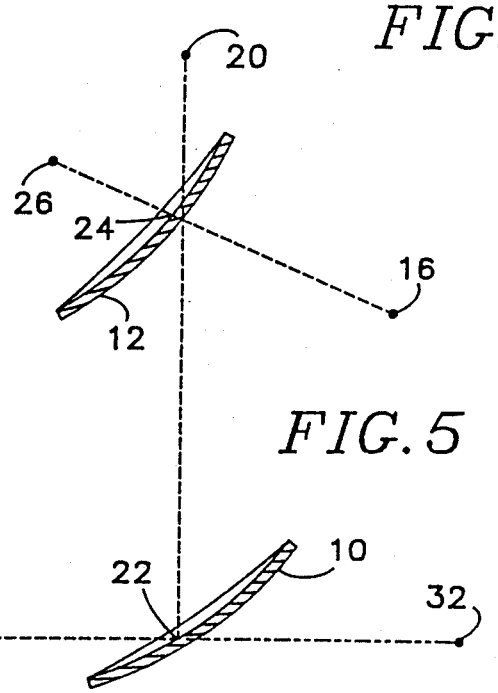
FIG. 5 is a schematic representation of a forward looking two mirror wide angle (image reducing) periscope utilizing a convex elliptical primary mirror and a concave elliptical secondary mirror.

FIG. 5 illustrates a forward looking wide angle periscope (image demagnification system) in which the primary mirror 12 is a convex ellipse and the secondary mirror 10 is a concave ellipse. Letting R1 be the distance between focal point 20 and the center 22 of the secondary mirror 10, L2 be the distance between center 22 and the center 24 of the primary mirror 12, L1 be the distance between the eye 14 of the observer and the center 22, S2 be the distance between the center 24 of the primary mirror 12 and the object point 16, and R2 be the distance from focal point 26 and the center 24 of the primary mirror, then the magnification equation is:

$$M = R1 \cdot R2 / [L1 \cdot (R1 - L2)]$$

and the image formation equation is $$(1/S1 + 1/L1) \cdot [R1/(R1 - L2) + (1/R2 + 1/S2) \cdot L2] =$$
$$(1/S2 + 1/R2) \cdot L2 \cdot (1/L2 - 1/R1)$$

The above equations allow the design of a periscope system per specifications of the application by an optical designer.

Figure 6:
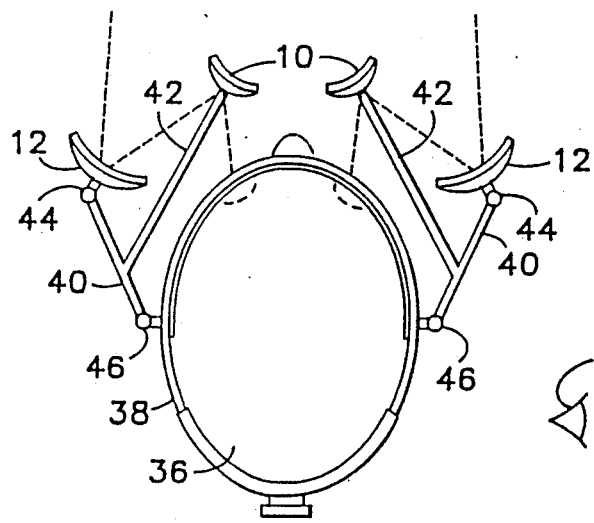
FIG. 6 is a plan view of a two mirror magnification system incorporated in a head mounted framework for forward viewing of a magnified image.

FIG. 6 illustrates a two mirror magnification system arranged for support on the head 36 of an observer. Thus, a headband 38 configured to encircle and be supported by the head 36, carries a pair of support rods 40 which mount a pair of laterally spaced concave primary mirrors 12. Cooperating convex secondary mirrors 10 are mounted forwardly of the primary mirrors on the forward ends of support rods 42. The magnified image of an object is viewed at the secondary mirrors 10, as will be understood. A joint 44 is provided which allows rotation of each primary mirror 12 around the axis of a line between the center of the primary mirror and the center of the associated secondary mirror 10, so as to maintain commonality of the shared focal centers of the primary and secondary mirrors. A joint 46 also is provided which allows movement and rotation of the primary and secondary mirrors as a unit. Additional degrees of movement can be easily added.

The second ramification of a curved mirror periscope system is a wide angle rearview periscope system for vehicles. This is a three mirror system, the third mirror being needed to reverse up-down and right-left inversion that will occur with two mirror systems when used for rear viewing. Light emitted from objects will be reflected by the primary mirror onto the intermediate mirror which will reflect the light onto the secondary mirror which, in turn, will reflect the light to the eye of the observer. This system is intended to be used for wide angle rear viewing for vehicle drivers, and is best achieved by use of a convex primary mirror, concave secondary mirror and a planar or concave intermediate mirror. The system preferably utilizes elliptical and hyperbolic surface mirrors, but other surfaces can be used as well. Spherical approximation can be used for initial design.

FIGS. 7, 8, 9 and 10 of the drawings illustrate such a wide angle rear viewing periscope mirror system for vehicles. The primary mirror 12 is a convex hyperbola. It is mounted outside the passenger compartment, as by means of a post 48 secured to the roof 50. In the preferred embodiment illustrated, the primary mirror 12 is positioned vertically above the windshield 52 so as to project light coming from objects to the rear and side of the automobile through the clear windshield and onto the intermediate concave hyperbolic mirror 54 which is mounted on the dashboard 56. The secondary mirror 10 also is mounted on the dashboard, displaced laterally from the intermediate mirror 54 in convenient position for viewing by the driver of the automobile. The secondary mirror 10 is a concave off-axis segment of an ellipse.

If desired, the primary mirror 12 may be mounted on a universal joint at the upper end of a longitudinally telescoping post assembly for vertical adjustment. In the vertically extended position of the post assembly the primary mirror can make available to the driver more of the area closer to the ground to the rear of the vehicle, and in the retracted position of the post assembly the primary mirror is protected against damage or misadjustment as might occur when the vehicle is subjected to the action of rotating brushes of an automatic car washing facility.

The ellipse defining the surface of the secondary mirror 10 has one focal point 14 which is also the point roughly midway between the two eyes of the driver.

The other focal point 20 of the secondary mirror 10 is behind the intermediate mirror 54 and it also serves as the first focal point of the hyperbola defining the intermediate mirror 54. The other focal point 58 for the intermediate mirror is along the line of the optical axis 18 connecting the center 60 of the intermediate mirror and the center 24 of the primary mirror 12. The focal point 58 also serves as a focal point for the hyperbola defining the primary mirror 12, the other focal point of which is at 26, the primary mirror being a convex hyperbola.

Since the focal point 58 of the intermediate mirror 54 is between it and the primary mirror 12, the intermediate mirror will invert the image that is projected by the primary mirror. The image generated by the primary mirror and the intermediate mirror will be upright, but will be right-to-left inverted. The secondary mirror 10 will preserve the up-down direction in the image, but will reverse the right-to-left inversion, and the end result will be true upright and right-to-left image.

The curvature of the mirrors is also adjusted so that the image seen by the driver looking at the secondary mirror 10 is virtual and far enough behind the secondary mirror so that accommodation and binocular vision is not strained. The magnification factor will be less than 1, typically between 0.2 and 0.5, so as to generate wide angle view. The design also will minimize the size of the primary mirror 12 and the intermediate mirror 54 by using the secondary mirror 10 as a magnifying mirror for the small image generated by small primary and intermediate mirrors. If desired, the primary mirror can be made of three separate surfaces, two for the side views and the central one for the rearview. Also, if desired, the post mount 48 for the primary mirror 12 may serve the additional function of a radio antenna.

It is preferred, as illustrated that the secondary and intermediate mirrors 10 and 54, respectively, be mounted on a common support member 62 which is mounted on the dashboard 56 by a universal pivot 64 the center of which is located on the axis 18 between the center points 24 and 60 of the primary and intermediate mirrors 12 and 54, respectively. This adjustment accommodates different positions of drivers in the driver's seat. Pivot 65 mounts the secondary mirror 10 on the support 62 to allow rotation of the secondary mirror 10 around the axis of the line between the center points 22 and 60 so as to adjust the image for drivers of different heights. Additional degrees of freedom can be added as needed.

To illustrate the structure and mode of operation of the rearview periscope illustrated in FIGS. 7, 8, 9 and 10, let:

L1 be the distance from the eye 14 of the driver to the center 22 of the secondary mirror 10.

L2 be the distance from the center 22 of the secondary mirror to the center 60 of the intermediate mirror 54.

L3 be the distance from the center 60 of the intermediate mirror to the center 24 of the primary mirror 12.

R1 be the distance from the center 22 of the secondary mirror 10 to the focal point 20 (which is a common focal point to mirrors 10 and 54).

R2 be the distance from the center 60 of the intermediate mirror 54 to the focal point 58 (which is a common focal point for mirrors 54 and 12).

R3 be the distance from the center 24 of the primary mirror 12 to the focal point 26 of the primary mirror.

The magnification M is defined as set forth hereinbefore for the two mirror system, i.e. the ratio of the spanning angle of the image when viewed from the eye 14 and the spanning angle of the object when viewed from the focal point 26. Accordingly, the magnification equation is:

$$L1/R1 \cdot (R1-L2)/R2 \cdot (L3-R2)/R3 = 1/M$$

There are more degrees of freedom in the three mirror design than in the two mirror system. As an example of typical dimensions, let it be assumed that L1 is approximately 45 centimeters; L2=0.8L1; L3=L1; R2=L2/2; R1=1.25 L2; and M=0.3. Then, L1=45 centimeters; L2=36 centimeters; L3=45 centimeters; R1=45 centimeters; R2=18 centimeters; and R3=4.05 centimeters. Accordingly, the intermediate and primary mirrors will be relatively small and the virtual image will be adequately positioned for the driver's view.

An alternative embodiment for vehicular rearview mirrors is to mount the three mirrors vertically, as illustrated in FIG. 11. In this embodiment the primary mirror 12 is convex and is mounted above and in front of the intermediate mirror 54. The intermediate mirror is below and behind the primary mirror 12 and faces forward. The intermediate mirror is mounted onto the forward edge of the roof 50 of the vehicle (FIG. 8), just above the windshield 52. The intermediate mirror will reflect light coming from the primary mirror 12 onto the secondary mirror 10 below it. The secondary mirror 10 is mounted in front of the driver and is concave.

Assuming the primary mirror 12 in FIG. 11 is a convex elliptical mirror, the intermediate mirror 54 is a concave hyperbola and the secondary mirror 10 is a concave ellipse, the magnification M is:

$$L1/R2 \cdot (L2-R1)/R2 \cdot (R2-L2)/R3 = 1/M$$

The design using the paraxial formulas for off-axis elliptical and hyperbolic mirror systems can proceed from that point.

A special case of the vertical mirror system illustrated in FIG. 11 is to provide a convex elliptical primary mirror 12, a planar intermediate mirror 54 and a concave elliptical secondary mirror 10. This arrangement has one less degree of freedom. As an illustration, if S2 is the distance of an object 30 at 16 from the center 24 of the primary mirror 12 and S1 is the distance of the image 30' from the secondary mirror 10, then:

$$[S2 \cdot R1/(R1 - L2 - L3) +$$
$$(1 + S2/R3) \cdot (L2 + L3)] \cdot (1/L1 + 1/S1) =$$
$$(1 + S2/R3)[1 - (L2 + L3)/R1]$$

The following is a presentation of the paraxial formulas for image formation of off-axis elliptical and hyperbolic mirrors: FIG. 12 shows a concave hyperbolic mirror similar to the one used as the primary mirror 12 for the image magnifying two-mirror periscope. In FIG. 12, a point object 16 is imaged on point 32 for viewing by the eye 14 of an observer. Points 20 and 26 are the two focal centers of the hyperbolic mirror 12. 14 is the observer's eye. A ray of light from object 16 directed toward focal point 26 will hit the concave hyperbolic mirror 12 at point 24 and will reflect towards focal center 20 and the observer's eye 14.

Let S2 be the distance of the object 16 to the point 24; R2 be the distance of the hyperbola focal center 26 to the point 24; and R1 be the distance from the focal point 20 to the point 24. A light ray from the point object 16 which is off to the side of the ray from 16 to 24 will hit the mirror 12 at point 66, and will be reflected so as to intersect the other ray at 32. Let S1 be the distance from image point 32 to the center 24 of mirror 12.

Let R be the radius of a sphere which will pass through the point 24 and will have the first and second derivative as the hyperbola, then:

$$1/S1 + 1/S2 = 1/R1 - 1/R2 = 2/R$$

The image generated by an elliptical mirror is illustrated in FIG. 13.

An object 16 which is close to the mirror 10 is imaged on 32. 14 is the eye of an observer as well as one of the focal points of the ellipse 10. 20 is the second focal center of the ellipse. A ray of light emitting from object point 16 along the line from focal point 20 to object point 16 will hit the mirror at point 22 and from there will be reflected onto the observer's eye 14. Another ray of light emitted by object point 16 will travel to the elliptical mirror 10 hitting it at point 68, and will be reflected from it in a different direction. Point 32 is the virtual image that is the intersection of the extension of the line from the eye 14 to the point 22 and the extension of the ray from 20 after being reflected at 68. Letting R2 be the distance from the focal point 20 to the intersecting point 22, R1 the distance from the eye 14 to the intersecting point 22, S1 the distance from the object point 16 to the point 22 and S2 the distance from the point 22 to the virtual image 32, then:

$$1/S1 - 1/S2 = -1/R1 - 1/R2$$

Approximating the ellipse by a spherical surface of radius R:

$$-2/R = -1/R1 - 1/R2 = 1/S1 - 1/S2$$

The above equations are applicable for convex ellipses by reversing the signs of R1, R2 and R.

FIG. 14 illustrates the formation of an image 32 of an object 16 seen by an eye at 14 looking into a convex hyperbolic mirror 10 with one focal point 14 in front of the mirror and the other focal point 20 behind the mirror. A ray of light from point 16 emitted towards focal point 20 will hit the mirror at 22 and will be reflected by the mirror onto the eye 14. Another ray of light from point 16 will hit the mirror at 70 and will be reflected toward 72. The intersection of the two lines defined by the two light rays reflected by the mirror will be point 32.

Let S1 be the distance from point 16 to point 22, R1 be the distance from focal point 20 to point 22, R2 be the distance from the focal point 14 to point 22, and S2 be the distance from point 32 to point 22. Then, $$1/S2 = 1/R2 = 1/R1 + 1/S1, \text{ or}$$
$$1/S1 - 1/S2 = 1/R2 - 1/R1.$$

Approximation of that convex hyperbola at point 22 by a convex spherical mirror of radius R will yield $$2/R = 1/S1 - 1/S2 = 1/R2 - 1/R1.$$

Referring to FIG. 2 of the drawings, angular magnification is defined as the ratio between the angular span of the image 30' seen by the observer at 14 looking at mirror 10, divided by the angular span of the original object 30 as seen from focal point 26 of the hyperbola describing the primary mirror 12. The angular span of an object as seen from focal point 26 will be the angle defined by 28-26-16 and the angular span of the image will be the angle 32-14-34. For a small angle, linear approximation of the relationship by geometrical proportions can be achieved as follows:

Let $\alpha$ = angle 32-14-34 = angle 22-14-74, then:
angle 22-20-74 = $\alpha \cdot L1/R1$
angle 16-26-28 = $\alpha \cdot L1/R1 \cdot (R1 + L2)/R2$ and by definition of M, the angular magnification:

angle 32-14-34/angle 16-26-28 = $1/M$ and
$1/M = L1/R1 \cdot (R1 + L2)/R2 = L1/R2 + L1 \cdot L2/R1 \cdot R2$ It will be apparent to those skilled in the art that various changes and modifications may be made in the structural details described hereinbefore without departing from the spirit of this invention and the scope of the appended claims:

I claim:
1. A curved mirror system, comprising:
   a) a primary mirror shaped as an off-axis segment of an ellipse or hyperbola and arranged to receive light rays from an object to be viewed, b) a convex secondary mirror shaped as an off-axis segment of an ellipse or hyperbola and arranged to receive light rays reflected directly from the primary mirror and to reflect said light rays directly to an observer, and
c) one of the focal centers of the ellipse or hyperbola defining the primary and secondary mirrors being common to both mirrors,
d) a second one of the focal centers of said ellipse or hyperbola defining the secondary mirror serving as the center for the eye of an observer.

2. The curved mirror system of claim 1 wherein the primary mirror is a concave segment of an hyperbola, and the secondary mirror is a convex segment of an hyperbola.

3. The curved mirror system of claim 1 wherein the primary mirror is a concave segment of an ellipse, and the secondary mirror is a convex segment of an hyperbola.

4. The curved mirror system of claim 1 wherein the primary mirror is a concave segment of an ellipse, and the secondary mirror is a convex segment of an ellipse.

5. A curved mirror system, comprising:
a) a primary mirror shaped as an off-axis concave segment of an ellipse or hyperbola and arranged to receive light rays from an object to be viewed, and
b) a secondary mirror shaped as an off-axis convex segment of an ellipse or hyperbola and arranged to receive light rays reflected directly from the primary mirror and to reflect said light rays directly to an observer,
c) the primary and secondary mirrors being arranged on different axes of rotation and one of the focal centers of the ellipse or hyperbola defining the primary and secondary mirrors being common to both mirrors,
d) a second one of the focal centers of said ellipse or hyperbola defining the secondary mirror serving as the center for the eye of an observer.

6. A curved mirror system, comprising:
a) a primary mirror shaped as an off-axis concave segment of an ellipse or hyperbola and arranged to receive light rays from an object to be viewed, and
b) a secondary mirror shaped as an off-axis convex segment of an ellipse or hyperbola and arranged to receive light rays reflected directly from the primary mirror and to reflect said light rays directly to an observer,
c) one of the focal centers of the ellipse or hyperbola defining the primary and secondary mirrors being common to both mirrors,
d) a second one of the focal centers of said ellipse or hyperbola defining the secondary mirror being offset laterally from a line extending between the primary and secondary mirrors through said common focal center and serving as the center for the eye of an observer.

* * * * *

UNITED STATES PATENT AND TRADEMARK OFFICE
CERTIFICATE OF CORRECTION

PATENT NO. : 5,214,540
DATED : 25 May 1993
INVENTOR(S) : YORAM YAKIMOVSKY

It is certified that error appears in the above-identified patent and that said Letters Patent is hereby corrected as shown below:

Column 5, lines 45 and 46 should read:

--$(1+S2/R2).(1+L2/R1)=[(1+S2/R2).L2+S2.R1/(L2+R1)].(1/S1+1/L1)$--.

Column 11, line 1 should read:

--b) a secondary mirror shaped as an off-axis convex--.

Signed and Sealed this

Fifteenth Day of March, 1994

Attest:

BRUCE LEHMAN

Attesting Officer     Commissioner of Patents and Trademarks